Dec. 8, 1925.
A. C. MATHIESON ET AL
AUTOMOTIVE BRAKE DEVICE
Filed Aug. 14, 1924
1,564,261
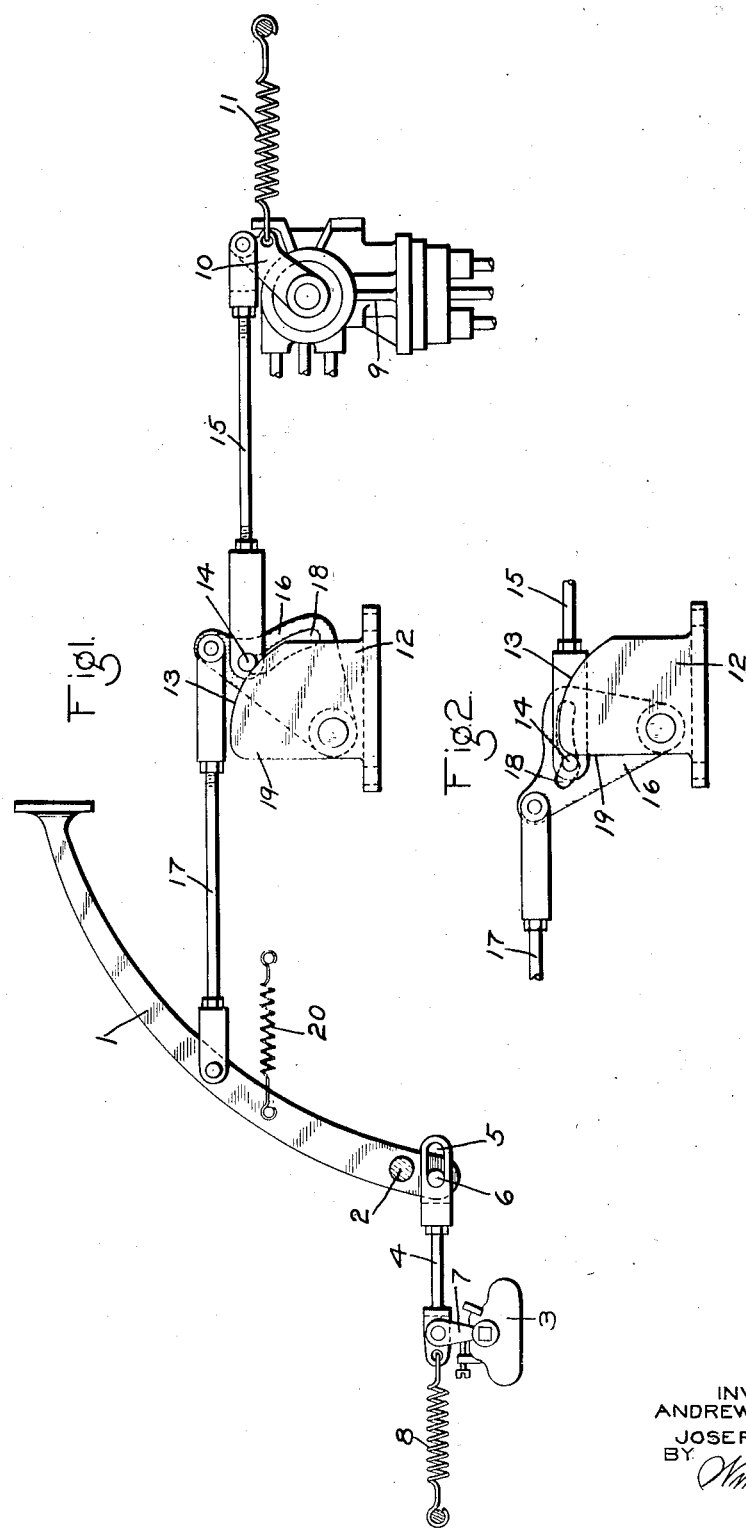
INVENTORS
ANDREW C. MATHIESON
AND
JOSEPH M. DAPRON
BY
ATTORNEY Patented Dec. 8, 1925.

1,564,261

UNITED STATES PATENT OFFICE.

ANDREW C. MATHIESON, OF EDGEWOOD, PENNSYLVANIA, AND JOSEPH M. DAPRON, OF ST. LOUIS, MISSOURI, ASSIGNORS TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed August 14, 1924. Serial No. 731,988.

*To all whom it may concern:*

Be it known that we, ANDREW C. MATHIESON and JOSEPH M. DAPRON, citizens of the United States, and residents, respectively, of Edgewood, in the county of Allegheny and State of Pennsylvania, and St. Louis, in the State of Missouri, have jointly invented certain new and useful Improvements in Automotive Brake Devices, of which the following is a specification.

This invention relates more particularly to apparatus for controlling the brakes and the accelerator of a motor vehicle by the operation of a single manually controlled element, such as a foot pedal.

It has heretofore been proposed to provide an equipment of the above character in which a spring tends to move the brake controlling member to application position for effecting an application of the brakes if the operator should become incapacitated and should remove his foot from the control pedal.

With an equipment of this character the accelerator is operated against the resistance of the spring which tends to move the brake control member to application position, so that the operator is compelled to exert additional pressure on the foot pedal in the accelerator controlling position.

The principal object of our invention is to provide means in connection with a motor vehicle control equipment of the above character for relieving the foot pedal of the force acting to move the brake control member to application position when in the accelerator control position.

In the accompanying drawing, Fig. 1 is a diagrammatic view of a motor vehicle control mechanism embodying our invention; and Fig. 2 a view of the means shown in Fig. 1 for relieving the foot pedal of spring pressure, showing said means in position with the spring held out of action.

As shown in the drawing, a foot operated pedal lever 1 is provided, which is fulcrumed on a pin 2. A motor accelerator 3 is operatively connected to one end of the lever 1 by means of a link 4 having an elongated slot 5 at one end for receiving a pin 6 carried by the end of lever 1. The link 4 is connected to arm 7 of the accelerator 3, so that forward movement of the lever 1, after the lost motion due to the slot 5 is taken up, will operate the accelerator. A spring 8 tends to hold the accelerator arm 7 in its idling position, as shown in Fig. 1.

A brake valve device 9 is provided having an operating arm 10, which is adapted to operate valve means, (not shown), for controlling the fluid pressure brakes. Connected to the arm 10 is a heavy coil spring 11 which tends to move the arm 10 to full brake application position, as shown in Fig. 1.

The brake valve device 9 is adapted to be operated by the pedal lever 1, but according to our invention a mechanism is interposed between the brake valve device and the pedal lever for relieving the pedal lever of the pressure of the spring 11, when the brake valve arm 10 has been shifted by the pedal lever to brake release position. Said mechanism may comprise a casting 12, secured at a convenient location on the car body or framing and provided with a cam face 13 on which a pin 14 is adapted to ride. The pin 14 is carried at one end of a rod 15, the other end of which is pivotally connected to the arm 10.

An arm 16 is pivotally mounted on the casting 12 and is pivotally connected to one end of a rod 17, the other end of which is pivotally connected to the pedal lever 1. The arm 16 is provided with a slot 18 in which the pin 14 is adapted to engage and the contour of the slot is so disposed that so long as the pin 14 is riding on the cam face 13, the pin 14 will be held by the slot against relative movement with respect to the arm 16 but when the arm 16 has been shifted to the position shown in Fig. 2, the slot is such that the arm 16 is free to move relatively to the pin 14.

In operation, when the foot pedal 1 is moved forward to release the brakes, the pin 14 rides on the cam face 13 of the casting 12 and the brake valve arm 10 is moved toward the left from the position shown in Fig. 1 to release position. In moving to this position, the pin 14 is caused to move off the cam face 13 and to engage the forward face 19 of the casting 12, by reason of the contour of the slot 18, as shown in Fig. 2.

The brakes are now released by the movement of the brake valve arm 10 and further movement of the pedal lever 1 toward the left will operate the arm 7 of the accelerator 3, the slot 5 being of such length that the lost motion will be taken up, so that pin 6 engages the end of the slot in the link 4 just as the parts are moved to brake release position.

It will now be noted that the pressure of the spring 11 is prevented from being transmitted to the arm 16 by the engagement of pin 14 with the forward face 19 of the casting 12, so that the operator is not required to constantly operate the accelerator 3 against the pressure of the spring 11.

A light spring 20 is connected to the lever 1 and tends to shift the lever toward the right, so that when the operator removes his foot from the pedal lever for any cause, such as becoming incapacitated, said lever will be returned to release position by the light spring 20 and then the spring 11 will act, as the pin 14 rides on the cam face 13, to shift the brake valve arm 10 to brake application position, so as to cause an application of the brakes.

Having now described our invention, what we claim as new and desire to secure by Letters Patent, is:—

1. The combination with mechanism for controlling the brakes, a yielding resistance for opposing movement of said mechanism, and a manually controlled device for operating said mechanism, of means for disconnecting said mechanism from operative engagement with said manually controlled device after a predetermined movement thereof, the further movement of said manually controlled device being free of said mechanism and said yielding resistance.

2. The combination with a brake valve device for controlling the fluid pressure brakes, a spring for resisting movement of said device from brake application position, and a manually operable device for operating said brake valve device, of means for relieving said manually operable device of the pressure of said spring upon a predetermined movement of said manually operable device.

3. The combination with a brake valve device having an operating arm, a spring opposing the movement of said arm, and a manually operated lever for actuating said arm against the resistance of the spring, of a pin movable with said arm, a lever having a slot for receiving said pin and operatively connected to said manually operated lever, and means for holding said pin against the resistance of said spring upon a predetermined movement of the manually operated lever, to permit a relative movement of said slotted lever and said manually operated lever.

4. The combination with a brake valve device and a spring for resisting movement of said brake valve device from brake application position, of a manually operated lever, an operating connection between said brake valve and said lever, and means interposed in said connection for permitting a movement of said lever relative to the brake valve device upon a predetermined movement of said lever.

5. The combination with a brake valve device, a spring for opposing movement of said brake valve device, a manually operated lever for operating said device, and a motor accelerator operatively connected to said lever, of means for permitting a relative movement of said lever for operating said accelerator upon movement of said brake valve device by said lever to release the brakes.

6. The combination with a brake valve device, a spring for opposing movement of said brake valve device, a manually operated lever for operating said device, and a motor accelerator operatively connected to said lever, of means operated upon movement of said brake valve device to release position by operation of said lever for holding said brake valve device against the resistance of said spring, to thereby permit a further relative movement of said lever for operating said accelerator.

In testimony whereof we have hereunto set our hands.

ANDREW C. MATHIESON.
JOSEPH M. DAPRON.